UNITED STATES PATENT OFFICE.

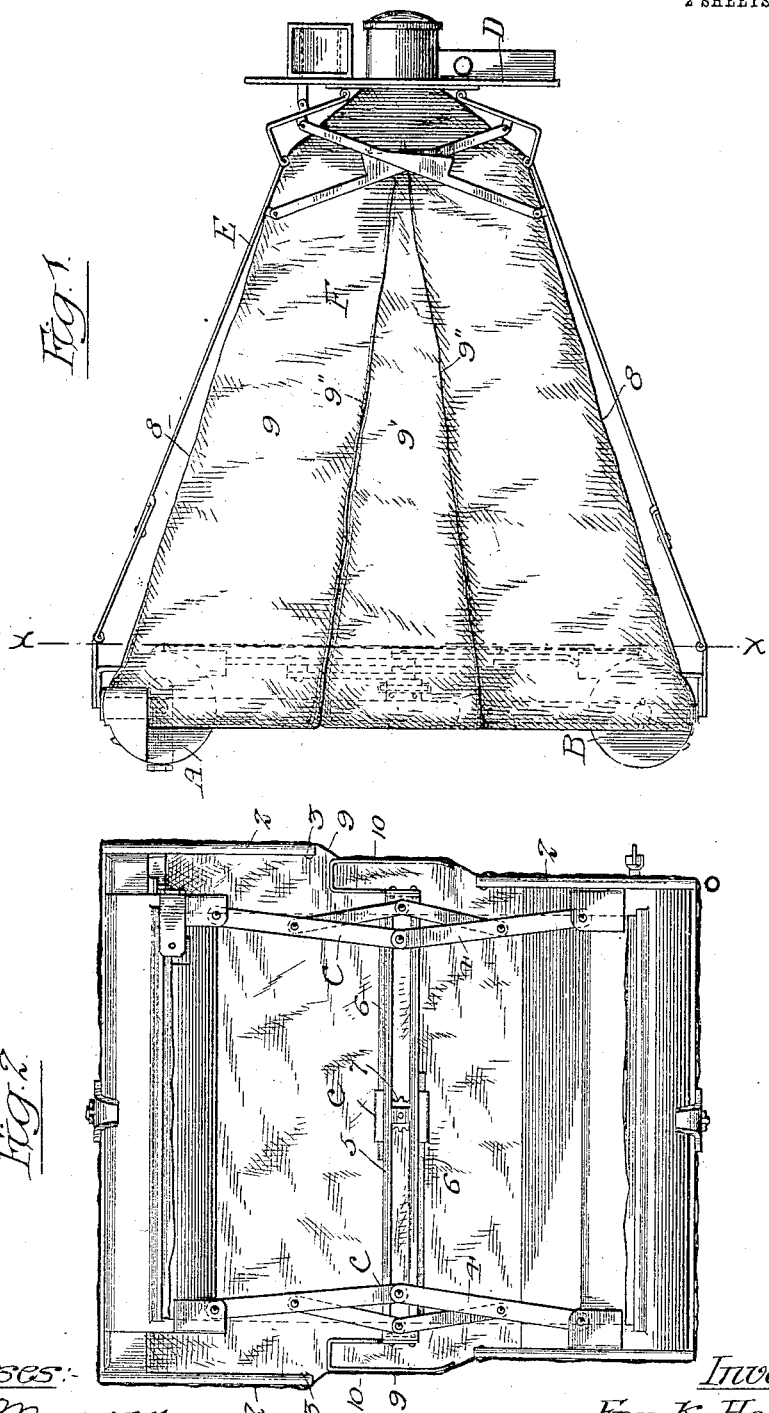

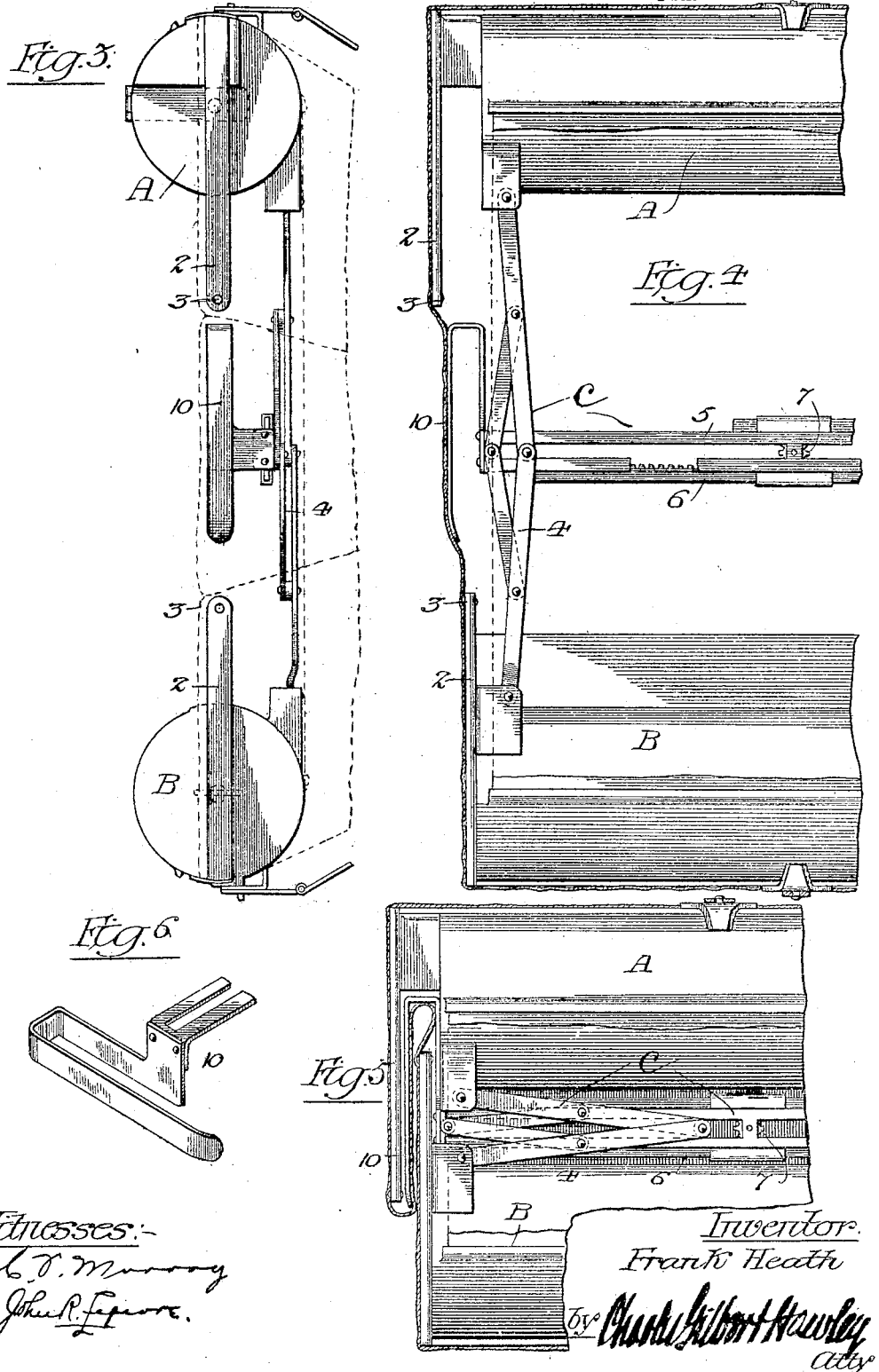

FRANK HEATH, OF NATIONAL CITY, CALIFORNIA.

POCKET-CAMERA.

No. 817,244.      Specification of Letters Patent.      Patented April 10, 1906.

Application filed April 27, 1905. Serial No. 257,732.

*To all whom it may concern:*

Be it known that I, FRANK HEATH, a citizen of the United States, and a resident of National City, San Diego county, California, have invented a new, useful, and Improved Pocket-Camera, of which the following is a full, clear, and exact description, such as will enable others skilled in the art to which it appertains to make and use the same.

My invention relates to photographic cameras, and has special reference to that class of cameras known in the trade as "pocket cameras."

My invention relates particularly to an improved light-excluding closure or bellows for the pocket-camera which is described and claimed in my pending application, Serial No. 231,764, filed November 7, 1904. The camera therein described comprises a film-holding mechanism and a lens-plate which is foldably joined to the film-holding mechanism. The film-rolls are contained in so-called "film-cases" which are relatively movable in a direction transverse to the axis of the camera. Except for a slight longitudinal adjustment which is required to maintain the focal distance between the camera-lens and the film, there is no longitudinal movement of the camera-bellows, the principal collapsing movement of my bellows being transverse. As a consequence I do not employ a bellows of the usual type, but use substantially flat pieces of flexible material, which pieces extend from the film-holding mechanism to the lens-plate, excluding the light from the intervening spaces.

The object of my present invention is to provide a simple, neat, and durable bellows for the camera described in aforesaid application; and my invention consists in a camera-bellows or light-excluding closure of the construction and arrangement hereinafter described, and particularly pointed out in the claims.

The invention will be more readily understood by reference to the accompanying drawings, forming a part of this specification, and in which—

Figure 1 is a plan view of my improved camera as viewed from beneath. Fig. 2 is a transverse section of the camera substantially on the line *x x* of Fig. 1. Fig. 3 is an enlarged plan view of the film-holding mechanism and the bellows-folding device. Fig. 4 is a front elevation thereof. Fig. 5 is a view similar to Fig. 4, showing the parts folded or collapsed; and Fig. 6 is a perspective view of one of the bellows-folding devices or clips.

The principal parts of my camera, as shown in the drawings, comprise the film-roll casings A and B, the parallel-motion mechanism C, the lens-plate D, the lens-plate-supporting and focal-distance-maintaining mechanism E, and the bellows F. Each of the film-roll casings is formed of two parts adapted to close together to exclude light from the films, and the two parts are pivotally joined by the extended hinge parts 2 2, having the remote pivots 3. The bellows is, in effect, formed in two parts, and the piece of flexible material which forms the back of the bellows is attached to the rear sides of the roll-casings A B and to the rear halves of the hinge parts 2 2. Only the middle part of the back piece is connected with the forward pyramidal part or is integral therewith. Access to the interior of the bellows is had by opening or swinging back the rear halves of the roll-casings. This is possible, because the ends of the back piece are separate from the forward bellows part. It is obvious that the rear stretch or portion of bellows must be of sufficient width or length to permit maximum expansion of the roll-casings.

The roll-casings are joined by the parallel-motion mechanism C, which mechanism, as described in my former application, comprises lazy-tong levers 4 4, joined by the rack-casing 5 and collapsible by means of the racks 6 6 and the connection-pinion 7. The rack-casing 5 is always parallel with the roll-casings, and it will be obvious that the casings are likewise always parallel, whether the same are moved and collapsed together, as shown in Fig. 5, or are distended, as shown in the other figures of the drawings. The back of the bellows lends itself readily to the collapsing movement of the roll-casings; but in my early experiments I found it difficult to provide or form the pyramidal portion of the bellows in such manner as to prevent the formation of heavy wrinkles therein when folded or partially folded. In some cases the bellows action was such as to form inwardly-extending wrinkles or bulges that obscured portions of the sensitive film, and the particular object of this invention is to provide for my camera a bellows which will not sag or fold inwardly in such manner as to interfere with the proper working of the camera.

Referring again to the drawings, it will be understood that the sides 8 8 of the bellows are formed of substantially triangular pieces of flexible material, such as coated leather. The top and the bottom of the bellows F are likewise formed of substantially triangular pieces 9 9. The side, top, and bottom pieces are suitably joined at the edges and at their forward ends are connected with the lens-plate D.

The rear edges of the top and bottom bellows-pieces 9 are at their ends (corresponding to free ends of back piece) attached to the inner sides or sections of the hinge portions 2 2, leaving a V-shaped portion free between each of the hinged parts 2 2, as well shown in Figs. 1 and 2. It is to the rear ends of these V-shaped portions that the middle edges of the back piece are attached, as before stated. To support the free middle portions of the top and bottom sections of the bellows, I employ two folding devices or clips 10 10 upon the ends of the rack-casing 5. The rear edges of these clips are substantially in line with the hinge portions 2 2, and the clips therefore serve to support the bellows in their middle portions, which would otherwise tend to bag or bulge inwardly, it being obvious that the flexible bellows-back would not in itself restrain or support the unsecured middle portions of the bellows top and bottom. In addition to the function of supporting the V-shaped portions 9' of the bellows the clips 10 operate to neatly fold the bellows parts 9 when the film-roll casings are collapsed.

The operation of the clips is well illustrated in Figs. 3, 4, and 5, from which it will be seen that when the roll-casings A and B are moved toward each other the hinge parts 2 2 on the casing B will pass beneath the free end of the clip 10, while the parts 2 of the casing A will pass over or outside of the clips 10. As the collapsing movement continues the middle portions of the top and bottom bellows parts will be drawn neatly beneath the clips, as shown in Fig. 5, the bellows parts 9 being kept flat in all positions. To facilitate the folding of the part 9, I prefer to heavily crease the same upon the lines 9'', although this is unnecessary when the material from which the bellows is made possesses the proper degree of flexibility. The form of the clip 10 will depend upon the construction and position of the parallel-motion mechanism employed between the roll-casings, and my invention is not confined to clips of the construction herein shown, it being obvious that the invention may be carried out with any device which shall present a support occupying a position parallel with the hinge portions of the casings and which shall be adapted to receive the bellows folds upon its outer and inner surfaces. The simple U-shaped clip attached to the end of the rack-casing 5, as herein shown, serves the purpose admirably, and I prefer it above all substitutes and equivalents known to me.

Having thus described my invention, I claim as new and desire to secure by Letters Patent—

1. In a camera of the class described, a lens-plate, in combination with a collapsible film-holding mechanism, means connecting said plate and mechanism, bellows composed of flexible material, the front end of said bellows being attached to said lens-plate, and portions of the rear edges of the bellows being fastened to said mechanism, leaving portions thereof free, and means carried by said mechanism for folding the free portions of said bellows when said mechanism is collapsed, substantially as described.

2. In a camera of the class described, a lens-plate, in combination with suitably-joined relatively collapsible film-roll cases, means connecting the said plate with said film-roll cases, a bellows having its rear edges secured upon said film-roll cases, and having its front end secured to said lens-plate, and means arranged between said film-roll cases for supporting and folding the intermediate portions of said bellows, substantially as described.

3. In a camera of the class described, a lens-plate, in combination with a bellows attached to the plate and film-holding mechanism collapsibly arranged in the rear end of said bellows, and means upon said film-holding mechanism for stretching said bellows uniformly and folding the same, substantially as described.

4. In a camera of the class described, a lens-plate, in combination with film-roll cases, parallel-motion mechanism joining said cases, suitable means connecting said cases to said lens-plate, bellows composed of flexible material and extending between said plate and said cases, a suitable back portion for said bellows and means upon said parallel-motion mechanism within the bellows for supporting and folding the otherwise free portions of said bellows, substantially as described.

5. In a camera of the class described, a lens-plate, in combination with film-roll cases, parallel-motion mechanism joining said cases, suitable means connecting the said cases with said plate, a pyramidal bellows having its front end attached to said plate, and suitable bellows holding and folding clips upon said parallel-motion mechanism, substantially as described.

6. In a camera of the class described, a lens-plate, in combination with relatively movable parallel film-roll cases, suitable mechanism joining said cases, means holding said cases and said plate in parallel planes, a bellows having its front end attached to said plate and its rear end attached to said cases, and means relatively movable between said cases for supporting and folding the intermediate portions of the bellows, substantially as described.

7. In a camera of the class described, a lens-plate, in combination with film-roll cases, lens-plate-supporting means connected with said cases, parallel-motion mechanism joining said film-roll cases, bellows attached to said lens-plate and composed of flexible material, portions of the rear edges of said bellows being attached to said film-roll cases, and U-shaped bellows holding and supporting clips upon said parallel-motion mechanism, substantially as described.

8. In a camera of the class described, a lens-plate, in combination with film-roll cases having extension hinge parts, parallel-motion mechanism joining said cases, suitable means connecting said plate to said cases, bellows attached to said lens-plate and composed of flexible material and having a suitable back portion, the rear edges of said bellows being attached to said film-roll cases and the hinge parts thereof, and means upon said parallel-motion mechanism substantially in the plane of said hinge parts, parallel therewith, and adapted to sustain the intermediate portions of the bellows and regularly fold the same, substantially as described.

9. In a camera of the class described, a lens-plate, in combination with film-roll cases, means joining the plate and cases, a pyramidal bellows composed of flat, flexible material attached to the lens-plate and to said cases and U-shaped clips upon said parallel-motion mechanism substantially in the plane of said cases and adapted to support and fold the intermediate portions of said bellows, substantially as described.

10. In a camera of the class described, a lens-plate and collapsible film-holding means transversely movable with respect to the lens-axis and suitably connected with said plate, in combination with a light-excluding bellows extending between said plate and said means, and comprising a plurality of flat portions, and means provided in connection with said film-holding means for folding said bellows, substantially as and for the purpose specified.

In testimony whereof I have hereunto set my hand, this 15th day of April, 1905, at Chicago, Cook county, Illinois, in the presence of two subscribing witnesses.

FRANK HEATH.

Witnesses:
CHARLES GILBERT HAWLEY,
CHAS. F. MURRAY.